United States Patent
Duda et al.

(10) Patent No.: US 10,609,597 B2
(45) Date of Patent: Mar. 31, 2020

(54) SYSTEM AND METHOD OF A PAUSE WATCHDOG

(71) Applicant: Arista Networks, Inc., Santa Clara, CA (US)

(72) Inventors: Kenneth James Duda, Menlo Park, CA (US); Michael Chih-Yen Wang, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 17 days.

(21) Appl. No.: 15/060,518

(22) Filed: Mar. 3, 2016

(65) Prior Publication Data

US 2017/0223575 A1 Aug. 3, 2017

Related U.S. Application Data

(60) Provisional application No. 62/288,967, filed on Jan. 29, 2016.

(51) Int. Cl.
*H04W 28/12* (2009.01)
*H04L 12/26* (2006.01)

(52) U.S. Cl.
CPC ............. *H04W 28/12* (2013.01); *H04L 43/16* (2013.01)

(58) Field of Classification Search
CPC ..... H04B 7/185; H04B 7/18517; H04L 12/26; H04L 29/06; H04L 69/24; H04L 43/0811; H04L 43/10; H04W 28/08; H04W 88/16
See application file for complete search history.

(56) References Cited

U.S. PATENT DOCUMENTS

| | | | |
|---|---|---|---|
| 8,797,877 B1* | 8/2014 | Perla | H04L 49/90 370/230 |
| 9,407,565 B1* | 8/2016 | Li | H04L 47/266 |
| 2003/0210653 A1* | 11/2003 | Pan | H04L 47/10 370/235 |
| 2009/0147685 A1* | 6/2009 | Malhotra | H04L 47/10 370/236 |
| 2014/0146666 A1* | 5/2014 | Kwan | H04L 47/12 370/230 |
| 2014/0269379 A1* | 9/2014 | Holbrook | H04L 43/0882 370/252 |

* cited by examiner

*Primary Examiner* — Kyaw Z Soe
(74) *Attorney, Agent, or Firm* — Haley Guiliano LLP

(57) ABSTRACT

A method and apparatus of a device that triggers a pause watchdog is described. In an exemplary embodiment, the device receives a pause message from a second network element on a first network element, where the pause message indicates that data should not be transmitted by the first network element. The device additionally triggers a pause watchdog on the first network element if the pause message is above a pause watchdog threshold, where the pause watchdog reduces the effect of the pause message.

26 Claims, 10 Drawing Sheets

SYSTEM AND METHOD OF A PAUSE WATCHDOG

RELATED APPLICATIONS

Applicant claims the benefit of priority of prior, provisional application Ser. No. 62/288,967, filed Jan. 29, 2016, the entirety of which is incorporated by reference.

FIELD OF INVENTION

This invention relates generally to data networking, and more particularly, to triggering a pause watchdog in response to multiple pause messages being received by a network element.

BACKGROUND OF THE INVENTION

A network topology used in a data center is a spine-leaf architecture, where multiple leaf network elements provide network access for servers that are in multiple server racks. In addition, the leaf network elements are interconnected to multiple spine network elements in a full mesh configuration, so that each of the leaf network elements can send data packets to the any of the spine network elements in one hop. Each of the leaf network elements can have high-speed uplink ports (e.g., 40 gigabits per second (Gbps) or 100 Gbps) connected to the spine network elements and lower speed downlink ports (e.g., 10 Gbps) connected to the servers in the server rack corresponding to that leaf network element.

A problem that can occur with this type of network architecture (or other types of multiply connected network architecture) if a network element or device misbehaves and causes a backup of the flow of traffic along a path that include this misbehaving node or device. In this problem, with a misbehaving network element or device along a path, data that is buffered for transmission in a queue along the path will not be transmitted. Instead, the queue starts to fill up and can eventually become full were no more data can be buffered in that queue. The device or network element can send pause messages to other devices or network elements that are sending data to the device or network element that has the filling queue due to the misbehaved network element or device. A pause message is a message sent to another device or network element indicating that other device or network element is not to send data to a device or network element that sent the pause message. This is further compounded is a network element that receives a pause message stops sending data and the queue for this network element fills up. Then, this network element will start sending pause message to other network element, where these network elements will than stop sending data. This can lead to a severe disruption in the network.

SUMMARY OF THE DESCRIPTION

A method and apparatus of a device that triggers a pause watchdog is described. In an exemplary embodiment, the device receives a pause message from a second network element on a first network element, where the pause message indicates that data should not be transmitted by the first network element. The device additionally triggers a pause watchdog on the first network element if the pause message is above a pause watchdog threshold, where the pause watchdog reduces the effect of the pause message.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
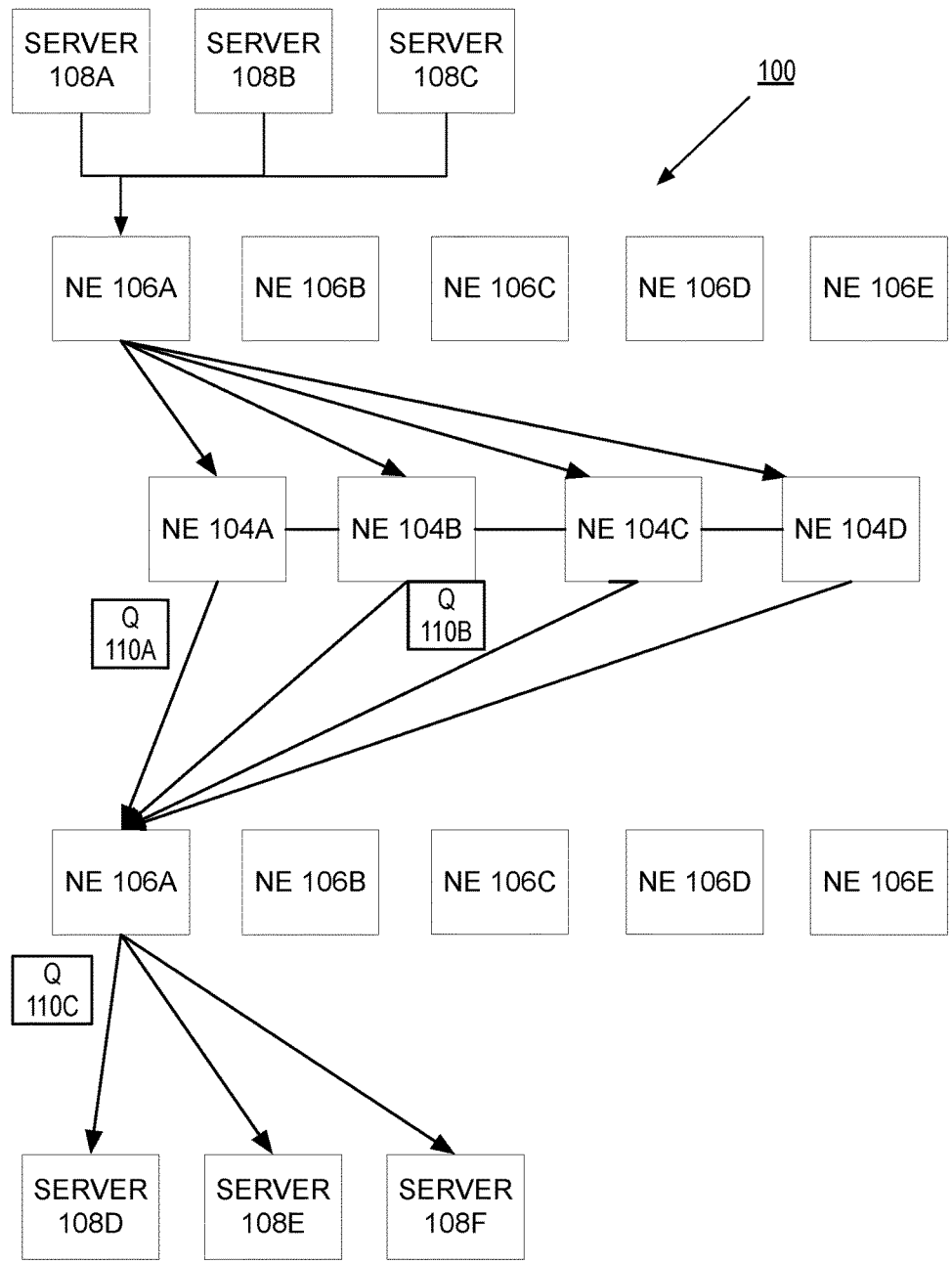
FIGS. 1A-B are block diagrams of embodiments of a system of network elements in a spine-leaf architecture.

A method and apparatus of a device that triggers a pause watchdog is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that triggers a pause watchdog is described. In one embodiment, a network element receives a pause message from another network element or device. Typically, if a network element receives a pause message from the other network element or device, the receiving network element will pause sending data to the network element or device that sent the pause message. A problem can occur because then the receiving network element will have its queues fill-up and can start sending pauses messages to other network element that are sending data to this network element. As more and more network elements pause sending data, there can be a disruption in the network. This problem is further compounded in mesh type networks (e.g., a spine-leaf network architecture), as will be described further below.

In this embodiment, the network element determines if the pauses message triggers a pause watchdog. In one embodiment, the pause watchdog could be triggered if there are too many pause messages being detected, and inadequate drain rate of a queue associated with the port that is receiving pause messages, there is an excessive queue occupancy of the queue associated with the port that is receiving the pause messages, and/or another type of threshold.

In one embodiment, if a pause watchdog is triggered, the pause watchdog can cause changes to how the network element or device receiving the pause messages operates after the pause watchdog is triggered. For example and in one embodiment, the pause watchdog can: (1) error disable the whole port that received the pause message; (2) perform a drop on ingress; (3) perform a drop by traffic class on ingress; and/or (4) suppress outbound pause messages. In this embodiment, each of the pause watchdog actions reduces the effect of the pause message can have on the rest of the network. In a further embodiment, the pause watchdog ignores or suppresses subsequent pause messages received by the network element.

Figure 1B:
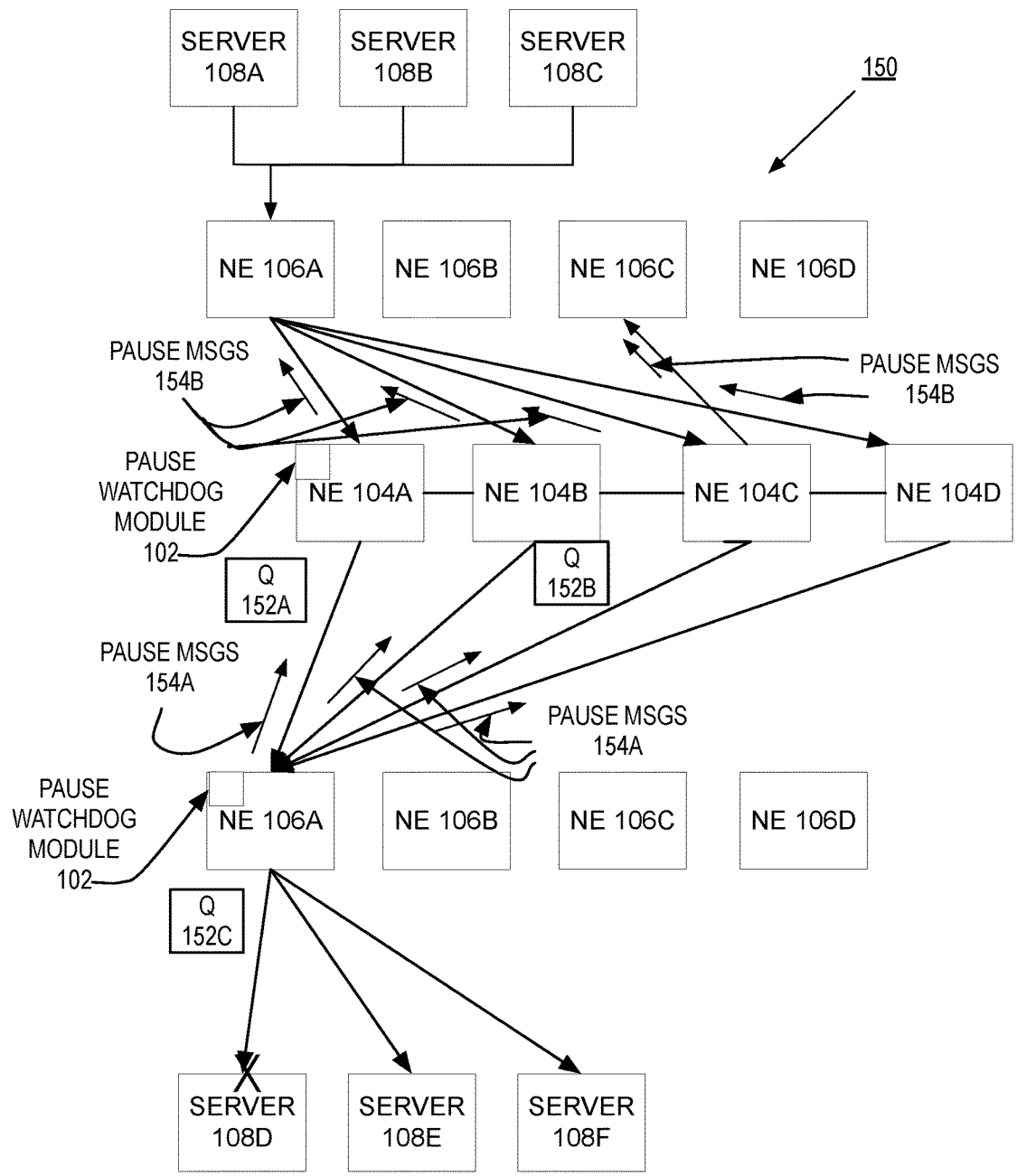

FIGS. 1A-B are block diagrams of embodiments of a system of network elements in a spine-leaf architecture. Each of the systems 100 and 150 in FIGS. 1A and 1B, respectively, illustrate a spine-leaf architecture that can be used data center. In FIG. 1, the network 100 includes spine network elements 104A-D that are coupled to each of the leaf network elements 106A-E. The leaf network elements 106A-E are further coupled to server racks 108A-E, respectively. In one embodiment, a spine network element 104A-D is a network element that interconnects the leaf network elements 106A-E. In this embodiment, each of the spine network elements 104A-D is coupled to each of the leaf network elements 106A-E. Furthermore, in this embodiment, each of the spine network elements 104A-D is coupled with each other. While in one embodiment, the network elements 104A-D and 106A-E are illustrated in a spine and leaf topology, in alternate embodiments, the network elements 104A-D and 106A-E can be in a different topology. In addition, and in one embodiment, the network elements 104A-E are further coupled to a controller 102 and a database 114. In one embodiment, each of the network elements 104A-D and/or 106A-E can be a router, switch, bridge, gateway, load balancer, firewall, network security device, server, or any other type of device that can receive and process data from a network. In one embodiment, the network elements 104A-D and 106A-E can be the same or different network elements in terms of manufacturer, type, configuration, or role. For example and in one embodiment, network elements 104A-D may be routers and network elements 106A-E may be switches. As another example and embodiment, network elements 104A-D may be high capacity switches with relatively few 10 gigabit (Gb) or 40 Gb ports and network elements 106A-E may be lower capacity switches with a large number of medium capacity port (e.g., 1 Gb ports) and high capacity ports to couple to the spine network elements 104A-D.

In FIG. 1A, the system 100 is illustrated so as to show the flow of data being transmitted from the different network elements. For example and in one embodiment, servers 108A-C transmit data to network element 106A. In this spine-leaf network architecture, the leaf network elements 106A-E forwards data received from downstream devices (e. g., servers 108A-C) to the spine network elements 104A-D. In turn, the spine network elements 104A-D forward the data to the next hop for that data. As illustrated in FIG. 1A, servers 108A-C can send data destined for servers 108D-F by sending the data first through network element 106A, which then forwards the data to one of the spine network elements 104A-D. In one embodiment, which of the spine network elements 104A-D that is selected by the leaf network element 106A depends on the utilization and/or other conditions associated with the spine network elements 104A-D. When the spine network elements 104A-D that received the data determines that the data is destined for server 108D, that spine network element 104A-D forwards this received data back to the leaf network element 106A. In turn, the leaf network element 106 forwards the data to the relevant destination server, one of servers 108D-F. Furthermore, as illustrated in FIG. 1A, each of the network elements maintains a queue associated with support that couples another network element or device. For example and in one embodiment, network element 104A includes a queue 110A that is used to buffer data does awaiting transmission for network element 106A. As another example and embodiment, network element 104B includes queue 110B that is also used two buffer data for transmission to network element 106A. In addition, network element 106A includes a queue 110C that is used to buffer data for transmission to server 108D.

A problem can occur with this type of network architecture (or other types of network architecture), if a network element or device misbehaves and causes a backup of the flow of traffic along a path that include this misbehaving node or device. In this problem, with a misbehaving network element or device along a path, data that is buffered for transmission in a queue along the path will not be transmitted. Instead, the queue starts to fill up and can eventually become full were no more data can be buffered in that queue. The device or network element can send pause messages to other devices or network elements that are sending data to the device or network element that has the filling queue due to the misbehaved network element or device. A pause message is a message sent to another device or network element indicating that other device or network element is not to send data to a device or network element that sent the pause message. FIG. 1B illustrates a problem with pause messages in a spine-leaf network architecture. In FIG. 1B, system 150 is similar to the system 100 is illustrated in FIG. 1A. In one embodiment, system 150 includes servers 108A-C that are coupled to the leaf network element 106A. Furthermore, and in this embodiment, leaf network elements 106A-D are coupled to spine network elements 104A-D. In addition, network element 106A is further coupled to servers 108D-F. Similar to the system 100 illustrated in and FIG. 1A, system 150 is illustrated to show the flow of data from servers 108A-C to network element 106A and onto network elements 104A-D where the data goes back to network element 104A and is transmitted to the destination servers 108D-F. In addition, three queues are illustrated in FIG. 1B, queue 152A that is part of network element 104A and is used to store data for transmission to network element 106A, queue 152B that is part of network element 104B and is used to store data for transmission to network element 106A, and queue 152C that is part of network element 106A and is used to store data for transmission to server 108D.

In one embodiment, server 108D is misbehaving (e.g., the server 108D is not processing data on the link between the server 108D and network element 106A, a network interface card on server 108D is faulty, or another type of error). In this embodiment, this means that data cannot be transmitted by network element 106A to server 108D. With this condition, the queue 152C begins to fill up which can in turn cause pause messages to be sent by network element 106A to other network elements or devices, where these pause messages indicate that those network elements or devices receiving these pause messages should not send data to network element 106A. For example and in one embodiment, if queue 152C fills up to a particular threshold, network element 106A will start sending pause messages to other network elements coupled to network element 106A, such as spine network elements 104A-D. Furthermore, in this example, because network elements 104A-D receive these pause messages 154A from network element 106A, the queues associated with the ports coupling each of the spy network elements 104A-D to network element 106A will also start to fill up, as these spine network elements 104A-D will stop transmitting data to network element 106A. This can cause each of the spine network elements 104A-D to send its own pause messages to other network elements coupled to these spine network elements 104A-D. For example and one embodiment, the spine network elements 104A-D can in turn send pause messages 154B to network elements 106A and 106C. In addition, each of the spine network elements 104A-D can send pause messages to other network elements, such as network elements 106B and 106D. In one embodiment, with the sending of the pause messages 154A-B, a misbehaving server 108D can stop transmission of data throughout parts or all of system 150. For example and in one embodiment, this misbehaved server 108D can stop transmission of data from leaf network elements 106A-D to spine networks 104A-D and this precludes the transmission of data from servers 108A-C. Thus, because of the use of the pause messages, this one misbehaving server 108D causes a severe disruption in system 150 even between devices or network elements that are not associated with the server 108D.

In one embodiment, to prevent or alleviate this disruption of network data transmission in system 150, some or all of the network elements 104A-D and/or 106A-D include a pause watchdog module 102. In this embodiment, the pause watchdog module 102 can be triggered if there are one or more pause messages detected (e. g., pause messages that are generated or received). In one embodiment, the pause watchdog module 102 can trigger a pause watchdog if there are too many pause messages being detected, an inadequate drain rate of a queue associated with the port that is receiving pause messages, there is an excessive queue occupancy of the queue associated with the port that is receiving the pause messages, and/or another type of threshold.

If a pause watchdog is triggered, the pause watchdog can cause changes is how the network element or device receiving the pause messages operates after the pause watchdog is triggered. For example and in one embodiment, the pause watchdog can: (1) error disable the whole port that received the pause message; (2) perform a drop on ingress; (3) perform a drop by traffic class on ingress; and/or (4) suppress outbound pause messages. In one embodiment, by error disabling the whole port that received the pause messages, data that is to be transmitted by that error disabled port would be dropped but other data to be transmitted out other ports may not be disrupted. In this embodiment, by disabling the port receiving the pause messages, the disruption of pause messages flooding other parts of the network would be eliminated or reduced, thus minimizing or reducing that system disruption as shown in FIG. 1B. For example and in one embodiment, network element 106A sends a pause message 154A to network element 104A. In this example, network element 104A could error disable the port coupling network element 106A to network element 104A. By doing this, network element 104A could also continue to receive and transmit data between other network elements, such as network elements 106B-D and network elements 104B-D.

In another embodiment, by performing a drop on ingress for the queue associated with the port receiving the pause message, a network element can eliminate or reduce the need to send further pause messages, thus breaking the chain of pause message flooding as seen in system 150. For example and in one embodiment, network element 104B could perform a drop on ingress for queue 152B, which is the queue associated with the port coupling network element 104B with network element 106A. Performing the drop for queue 152B allows network element 104B to not have that queue in a state where additional pause messages are needed to be sent by network element 104B.

In a further embodiment, by performing a drop by traffic class on ingress for a queue associated with the port receiving the pause message, a network element can selectively eliminate or reduce the data that will eventually be destined for the misbehaving network element or device allow data to be transmitted by that port to destinations that would avoid the misbehaving network element or device. For example and in one embodiment, network element 104A could store data that is destined for both servers 108D and 108E. In this example, data destined for both of the servers will have a next hop to network element 106A. However, data destined for server 108D will be stuck in queue 152C (or dropped by network element 106A), and potentially causing network element 106A to send further pause messages. Data destined for server 108E, on the other hand, would be sent to network element 106A, where network element 106A would transmit this data to server 108E. Thus, network element 104A could drop data in a traffic class associated with server 108D on ingress to queue 152A and allow data in other traffic classes (e.g., a traffic class for data destined to server 108E) to be buffered in queue 152A. As with performing the general drop described above, performing a drop on ingress for by traffic class allows network element 104A to not have that queue in the state were additional pause messages are needed to be sent by network element 104A.

In yet another embodiment, a network element that receives pause messages and detects that queue(s) are filling up on that network element could simply suppress generation of further outbound pause messages. By suppressing the generation of further outbound pause messages, a network element would break the flood of pause messages as illustrated in system 150. In the description above, the pause watchdog can implement one or more of these methods to control or eliminate the network interruption of data flow in system 150.

In one embodiment, the pause watchdog 102 and the functions of the pause watchdog 102 are implemented in hardware (e.g., implemented in an application-specific integrated circuit (ASIC), a field-programmable gate array (FPGA), or in firmware).

Figure 2:
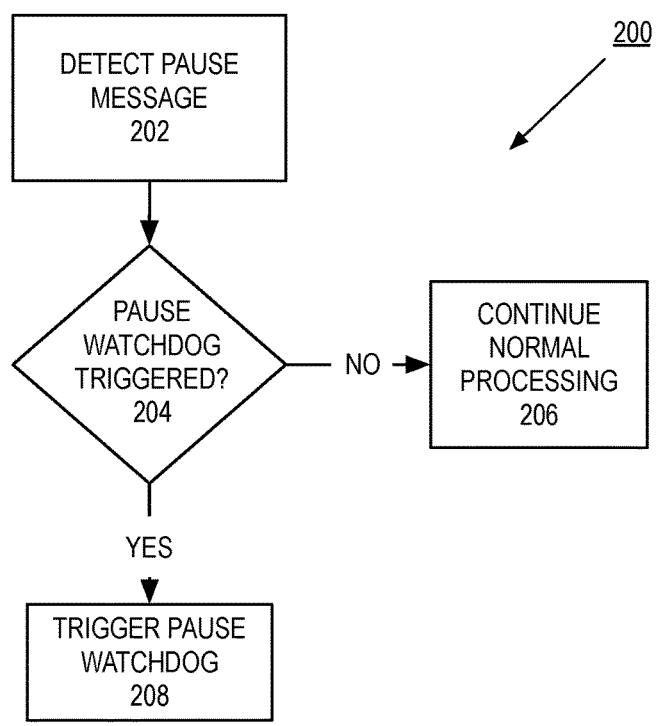
FIG. 2 is a flow diagram of one embodiment of a process to trigger a pause watchdog.

As per above, the pause watchdog can be triggered based on a variety of conditions and can further be used to control or minimize the pause message flooding. FIG. 2 is a flow diagram of one embodiment of a process 200 to trigger a pause watchdog. In one embodiment, process 200 is performed by a pause watchdog module, such as the pause watchdog module 102 as described in FIG. 1A above. In FIG. 2, process 200 begins by detecting a pause message at block 202. In one embodiment, process 200 can detect a pause message by receiving a pause message or generating a pause message. A block 204, process 200 determines if the pause watchdog is triggered. In one embodiment, process 200 triggers the pause watchdog by determining that there are too many pause messages being detected, and inadequate drain rate of a queue associated with the port that is receiving pause messages, there is an excessive queue occupancy of the queue associated with the port that is receiving the pause messages, and/or another type of threshold. For example and in one embodiment, process 200 could trigger the pause watchdog if the number of pause messages being received on a port is greater than a threshold. Alternatively, process 200 can trigger the pause watchdog if the drain rate of the queue associated with the port that received a pause message is inadequate. In one embodiment, the drain rate inadequacy can be measured as a percentage of the maximum bandwidth of the port, a fixed amount, or some other measure. As another example and embodiment, process 200 can trigger the pause watchdog if the queue occupancy of the queue associated with the port that received the pause message is above a certain threshold. A queue occupancy threshold for pause watchdog trigger is further described in FIG. 3 below. If the pause watchdog is not to be triggered, process 200 continues with normal processing a block 206.

If the pause watchdog is to be triggered, process 200 triggers the pause watchdog at block 208. In one embodiment, process 200 triggers the pause watchdog for the network element that receives the pause message. In this embodiment, the pause watchdog performs one or more actions so as to minimize or reduce the effect of the received pause messages. For example and in one embodiment, the pause watchdog can: (1) error disable the whole port that received the pause message; (2) perform a drop on ingress; (3) perform a drop by traffic class on ingress; and/or (4) suppress outbound pause messages as described above in reference to FIG. 1A. In one embodiment, process 200 can further ignores or suppresses subsequent pause messages received by the network element.

Figure 3:
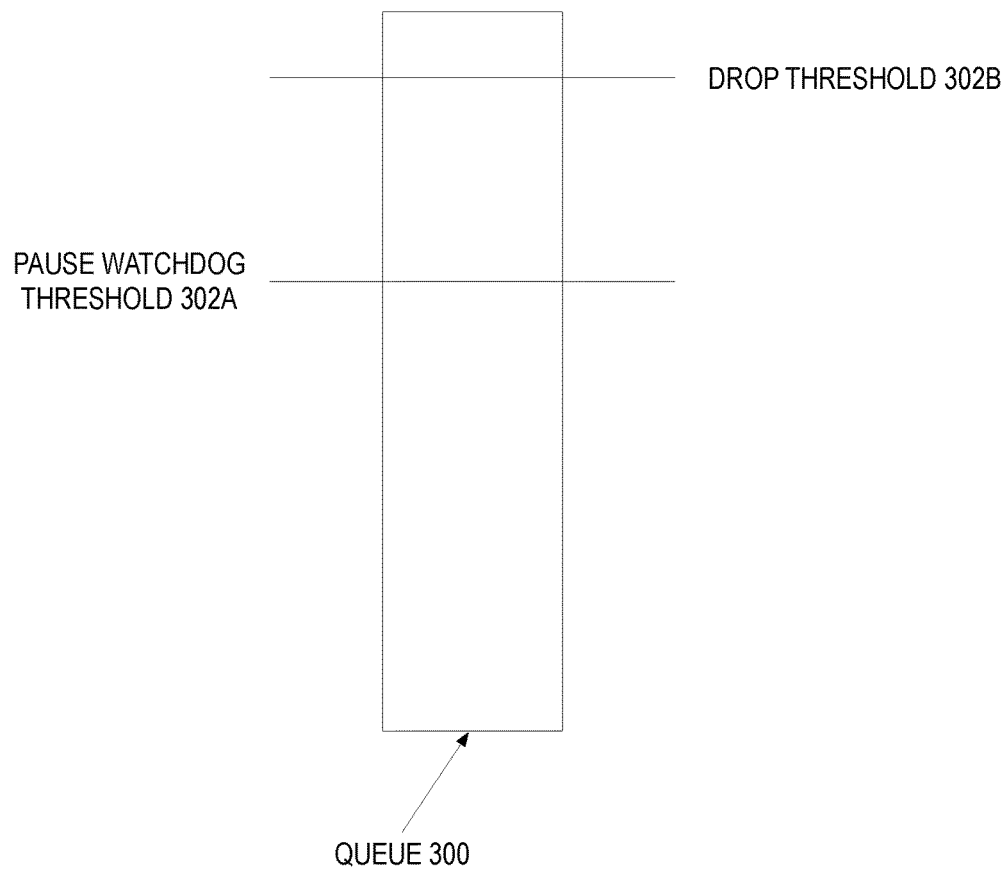
FIG. 3 is an illustration of queue.

FIG. 3 is an illustration of queue 300. In one embodiment, a queue 300 is storage that the network element uses to store data (e.g., packets) for transmission. In one embodiment, a queue for a port can be an individual queue, multiple queues, a class of queues, or multiple classes of queues. Each individual queue can be a first-in, first-out queue; last in, first out queue; strict priority queue; egress queue; or another type of queue used for a port.

In one embodiment, a queue occupancy of a queue represents the amount of the queue resources that are being used to store packets awaiting transmission. Queue occupancy can be measured using one or more different metrics, such as queue depth, packet latency, number of buffers used, and/or number of buffer descriptors used. If the network element stores a packet in the queue, the queue occupancy increases, whereas if a packet is de-queued from the queue for transmission, the queue occupancy decreases. In one embodiment, the network element stores the current queue occupancy of a queue in an ASIC in near real-time (e.g., within a delay of within 800 microseconds).

In one embodiment, there are two different thresholds 302A-B: a pause watchdog threshold 302A and a drop threshold 302B. In one embodiment, the pause watchdog threshold 302A is the lowest of the thresholds (e.g., lowest queue occupancy) and the drop threshold 302B is the highest level threshold. In one embodiment, the queue occupancy can be a function of one or more different queue resource metrics (e.g., queue depth, packet latency, number of buffers used, and/or number of buffer descriptors used). Each of these thresholds can be set for a particular value of the queue occupancy. In one embodiment, if the queue occupancy of a queue is greater than the pause watchdog threshold 302A, the pause watchdog module triggers the pause watchdog as described above. In one embodiment, the queue occupancy is measured via the ASIC and is performed with a periodicity that is smaller than the periodicity used by the control plane to poll the dropped counters. For example and in one embodiment, the periodicity is on the order of less than a millisecond (e.g., 800 microseconds) for the queue occupancy recordation. In one embodiment, the pause watchdog threshold 302A can be a threshold that is a threshold that is based on one of the metrics for the queue occupancy (e.g., queue depth, packet latency, etc.) or can be a combination of two or more of the queue occupancy metrics (e.g., queue depth and packet latency). In one embodiment, the pause watchdog threshold 302A for a queue 300 is a queue occupancy of less than 50% of the queue depth (e.g., 20% or 25%). In one embodiment, once the queue occupancy of the queue 300 reaches the drop threshold 302B, the pause watchdog can perform a drop on ingress or a drop on ingress by traffic class as described above.

Figure 4:
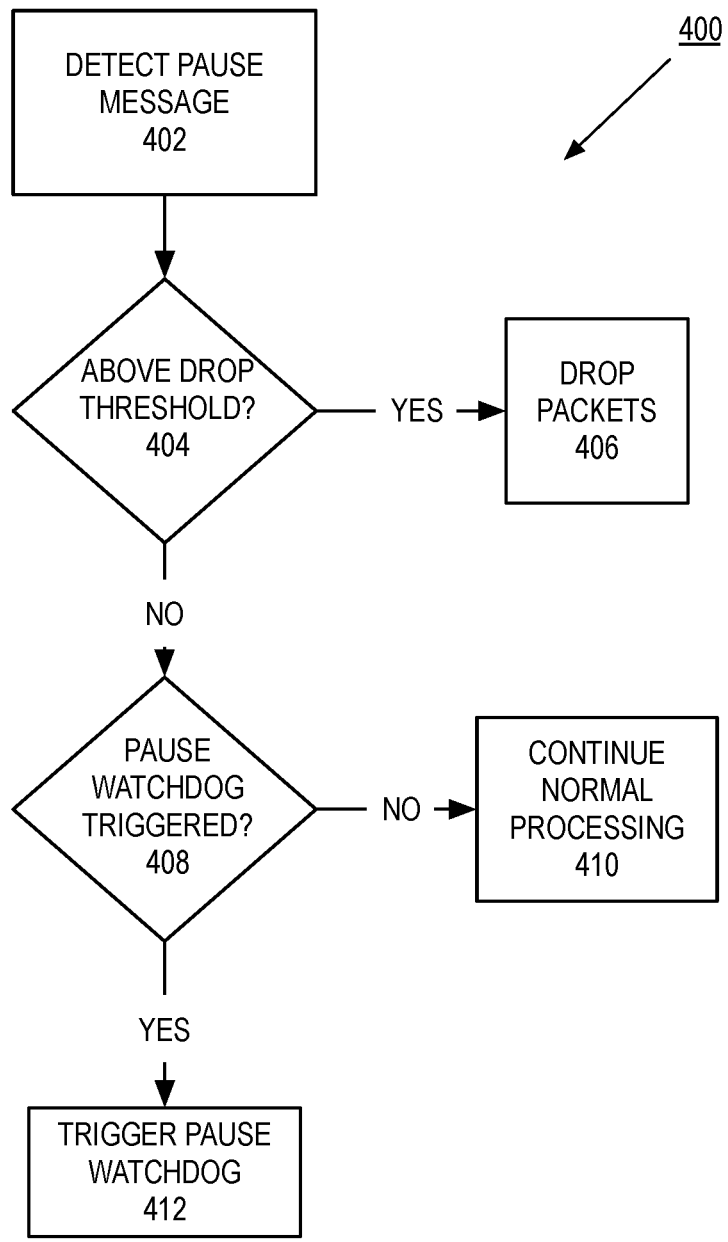
FIG. 4 is a flow diagram of one embodiment of a process to trigger a pause watchdog or a drop packet action.

In FIG. 3, different queue thresholds are illustrated that are used to trigger different actions if the queue fills at or above these thresholds. For example and in one embodiment, if the queue occupancy is at or above the pause watchdog or drop thresholds, the pause watchdog can be triggered or packet can be drop on ingress to that queue, respectively. FIG. 4 is a flow diagram of one embodiment of a process 400 to trigger a pause watchdog or a drop packet action. In one embodiment, process 400 is performed by a pause watchdog module, such as the pause watchdog module 102 as described in FIG. 1A above. In FIG. 4, process 400 begins by detecting a pause message at block 402. In one embodiment, process 400 can detect a pause message by receiving a pause message or generating a pause message. At block 404, process 400 determines if the queue occupancy for the queue associated with the port is above the drop threshold. In one embodiment, the drop threshold for a queue is the threshold at which data being added to the queue may be dropped. If the queue occupancy is below the drop threshold, execution proceeds to block 408 below. If the queue occupancy is at or above the drop threshold, process 400 starts to drop packets. In one embodiment, process 400 will drop packets entering the queue associated with the port that received the pause message. For example and in one embodiment, process 400 drops packet on ingress to this queue.

At block 408, process 400 determines if the pause watchdog is triggered. In one embodiment, process 400 triggers the pause watchdog by determining that there are too many pause messages being detected, and inadequate drain rate of a queue associated with the port that is receiving pause messages, there is an excessive queue occupancy of the queue associated with the port that is receiving the pause messages, and/or another type of threshold. For example and in one embodiment, process 400 could trigger the pause watchdog if the number of pause messages being received on a port is greater than a threshold. Alternatively, process 400 can trigger the pause watchdog if the drain rate of the queue associated with the port that received a pause message is inadequate. In one embodiment, the drain rate inadequacy can be measured as a percentage of the maximum bandwidth of the port, a fixed amount, or some other measure. As another example and embodiment, process 400 can trigger the pause watchdog if the queue occupancy of the queue associated with the port that received the pause message is above a certain threshold. A queue occupancy threshold for pause watchdog trigger is further described in FIG. 3 below. If the pause watchdog is not to be triggered, process 400 continues with normal processing a block 410.

If the pause watchdog is to be triggered, process 400 triggers the pause watchdog at block 412. In one embodiment, process 400 triggers the pause watchdog for the network element that receives the pause message. In this embodiment, the pause watchdog performs one or more actions so as to minimize or reduce the effect of the received pause messages. For example and in one embodiment, the pause watchdog can: (1) error disable the whole port that received the pause message; (2) perform a drop on ingress; (3) perform a drop by traffic class on ingress; and/or (4) suppress outbound pause messages as described above in reference to FIG. 1A. In one embodiment, process 400 can further ignores or suppresses subsequent pause messages received by the network element.

Figure 5:
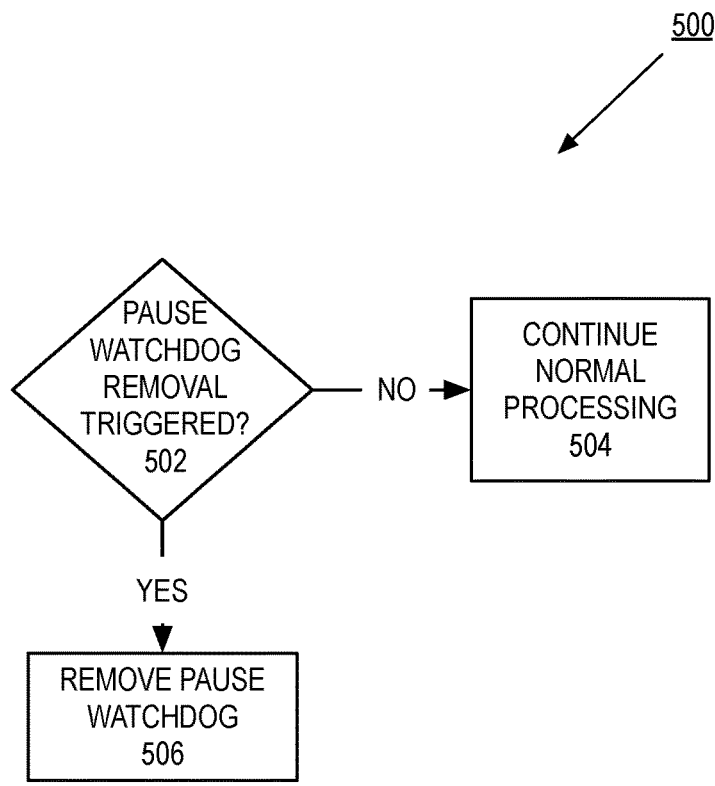
FIG. 5 is a flow diagram of one embodiment of a process to remove a pause watchdog.

FIG. 5 is a flow diagram of one embodiment of a process 500 to remove a pause watchdog. In one embodiment, process 500 is performed by a pause watchdog removal module, such as the pause watchdog module 102 as described in FIG. 1A above. In FIG. 5, process 500 begins by determining if the pause watchdog removal is triggered. In one embodiment, process 500 removes the pause watchdog if (1) process 500 does not receive a pause message after x seconds, (2) a certain amount of time has expired since the port was error disabled, (3) the queue associated with the port receiving the pause message has an acceptably low queue occupancy rate (e.g., below the queue occupancy threshold as illustrated in FIG. 3 above), (4) a sufficient drain rate of that queue, (5) manual intervention by an administrator, and/or another type of condition. If one or more of these conditions occurs, at block 506, process 500 removes the pause watchdog. In one embodiment, process 500 removes the watchdog by stopping the process that is executing the watchdog. If the pause watchdog removal is not triggered, process 500 continues the normal processing at block 504.

Figure 6:
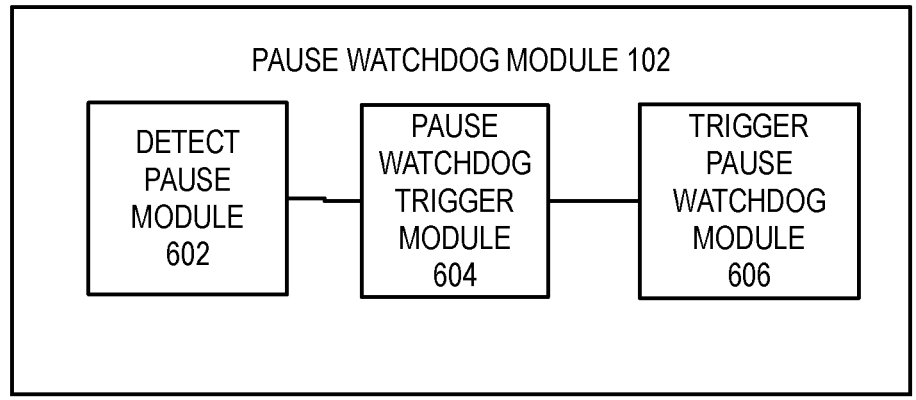
FIG. 6 is a block diagram of one embodiment of a pause watchdog module that triggers a pause watchdog.

FIG. 6 is a block diagram of one embodiment of a pause watchdog module 102 that triggers a pause watchdog. In one embodiment, the pause watchdog module 102 includes a detect pause module 602, a pause watchdog trigger module 604, and a trigger pause watchdog module 606. In one embodiment, the detect pause module 602 detects a pause message as described in FIG. 2, block 202 above. The pause watchdog trigger module 604 determines if the pause watchdog is triggered as described in FIG. 2, block 204 above. The trigger pause watchdog module 606 executes the pause watchdog as described in FIG. 2, block 206 above.

Figure 7:
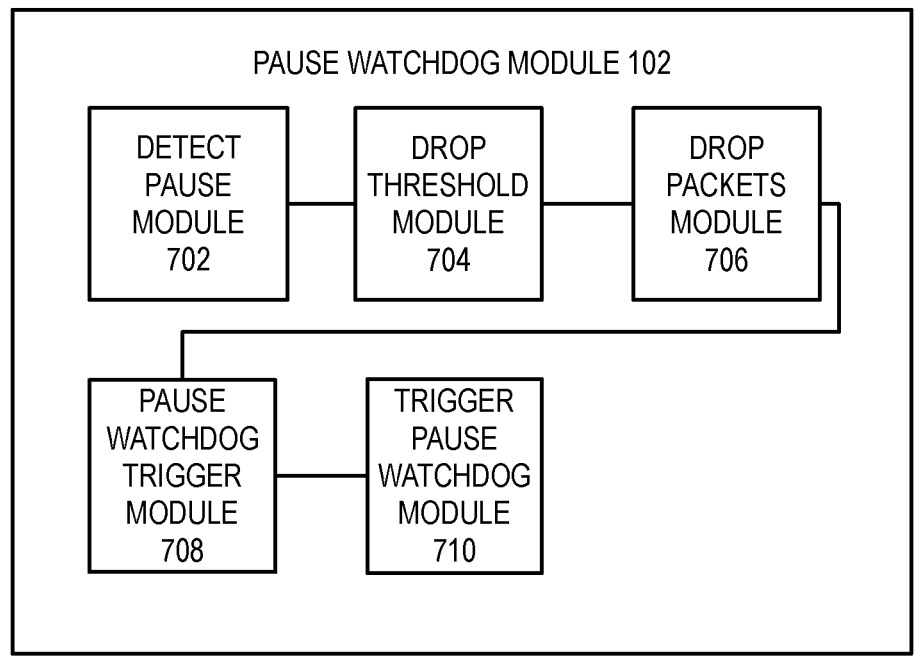
FIG. 7 is a block diagram of one embodiment of a pause watchdog module that triggers a pause watchdog or drops packet above a drop threshold.

FIG. 7 is a block diagram of one embodiment of a pause watchdog module 102 that triggers a pause watchdog or drops packet above a drop threshold. In one embodiment, the pause watchdog module 102 includes a detect pause module 702, drop threshold module 704, drop packets module 706, pause watchdog trigger module 708, and trigger pause watchdog module 710. In one embodiment, the detect pause module 702 detects a pause message as described in FIG. 4, block 402 above. The drop threshold module 704 determines if the drop threshold of a queue has been reached as described in FIG. 4, block 404 above. The drop packets module 706 drops packets on ingress to the queue as described in FIG. 4, block 406 above. The pause watchdog trigger module 708 determines if the pause watchdog is triggered as described in FIG. 4, block 408 above. The trigger pause watchdog module 710 executes the pause watchdog as described in FIG. 4, block 410 above.

Figure 8:
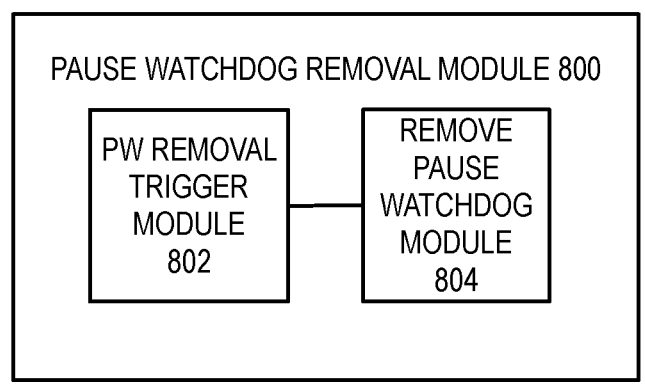
FIG. 8 is a block diagram of one embodiment of a pause watchdog removal module that removes a pause watchdog.

FIG. 8 is a block diagram of one embodiment of a pause watchdog removal module 800 that removes a pause watchdog. In one embodiment, the pause watchdog removal module 800 includes a pause watchdog removal trigger module 802 and remove pause watchdog module 804. In one embodiment, the pause watchdog removal trigger module 802 determines if the pause watchdog is to be removed as described in FIG. 5, block 502 above. The remove pause watchdog module 804 removes the pause watchdog as described in FIG. 5, block 504 above.

Figure 9:
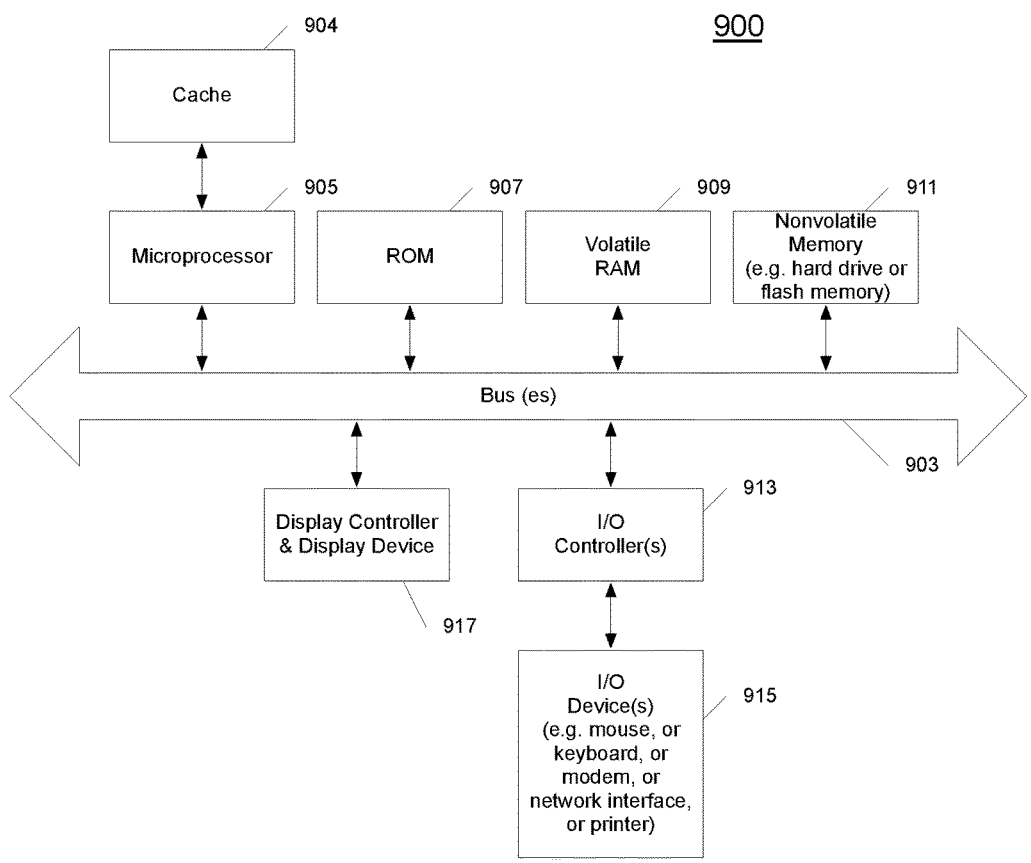
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a writer node 102 as shown in FIG. 1A above. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
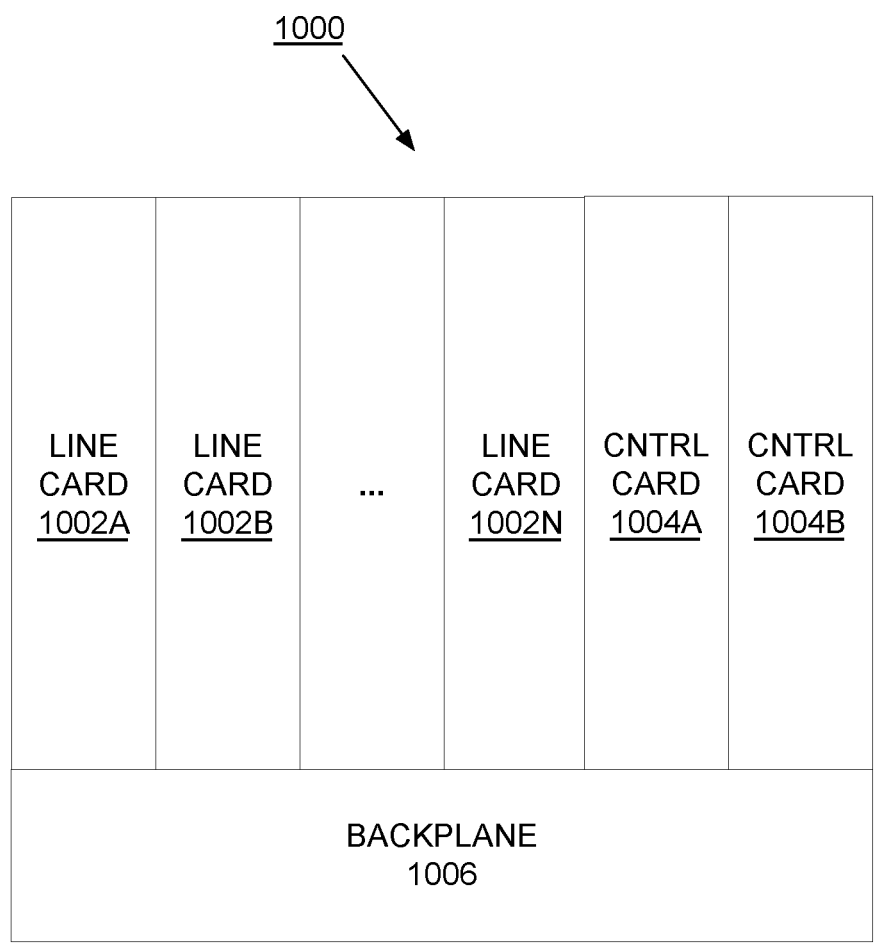
FIG. 10 is a block diagram of one embodiment of an exemplary network element 1300 that triggers a pause watchdog.

FIG. 10 is a block diagram of one embodiment of an exemplary network element 1000 that triggers a pause watchdog. In FIG. 10, the backplane 1006 couples to the line cards 1002A-N and controller cards 1004A-B. While in one embodiment, the controller cards 1004A-B control the processing of the traffic by the line cards 1002A-N, in alternate embodiments, the controller cards 1004A-B, perform the same and/or different functions (e.g., triggering a pause watchdog). In one embodiment, the controller cards 1004A-B triggers a pause watchdog as described in FIGS. 1, 2 and 4. In this embodiment, one or both of the controller cards 1004A-B include pause watchdog module, such as the pause watchdog module 102 as described in FIG. 1B above. It should be understood that the architecture of the network element 1000 illustrated in FIG. 10 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "triggering," "determining," "removing," "failing," "creating," "increasing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to trigger a pause reduction component, the method comprising:
   receiving a pause message on a first network element, wherein the pause message is from a second network element and indicates that data should not be transmitted by the first network element; and
   in response to receiving the pause message, triggering the pause reduction component on the first network element when a characteristic of the first network element is above a pause reduction threshold, wherein the pause reduction component reduces an effect of the pause message and the pause reduction threshold is based on at least one of a particular number of pause messages, an inadequate drain rate of a queue associated with the second network element, or a queue occupancy of the queue associated with the second network element.

2. The non-transitory machine-readable medium of claim 1, wherein the pause reduction component reduces the effect of the pause message by causing the first network element to suppress the pause message such that the first network element continues to transmit data to the second network element.

3. The non-transitory machine-readable medium of claim 1, wherein the pause reduction component suppresses an outbound pause message to another network element.

4. The non-transitory machine-readable medium of claim 1, wherein the pause reduction component error disables a port coupling the second network element to the first network element.

5. The non-transitory machine-readable medium of claim 1, wherein the pause reduction component performs a drop on data being added to a queue associated with a port that couples the second network element to the first network element.

6. The non-transitory machine-readable medium of claim 1, wherein the pause reduction component performs a drop on data in a particular traffic class being added to a queue associated with a port that couples the second network element to the first network element.

7. The non-transitory machine-readable medium of claim 6, wherein the data in the particular traffic class is data destined for a device that is coupled to the second network element.

8. The non-transitory machine-readable medium of claim 1, wherein the pause message is an 802.3x pause message.

9. The non-transitory machine-readable medium of claim 1, further comprising:
   removing the pause reduction component.

10. The non-transitory machine-readable medium of claim 9, wherein the removing the pause reduction component occurs if the first network element detects an action selected from the group consisting of the first network element not having received a further pause message after a first period of time, a second period of time has passed since an error disable of a port coupling the second network element has occurred, a queue associated with a port receiving the pause message is at or below a queue occupancy threshold, and the queue has a sufficient drain rate.

11. The non-transitory machine-readable medium of claim 1, further comprising: ignoring a pause message received by the first network element.

12. The machine-readable medium of claim 1, further comprising:
    detecting that a characteristic of the first network element is above a pause reduction component removal threshold; and
    removing a pause reduction component on the first network element.

13. A non-transitory machine-readable medium having executable instructions to cause one or more processing units to perform a method to trigger a pause reduction component, the method comprising:
    measuring a drain rate of a queue on a first network element;
    detecting that the drain rate is inadequate relative to a pause reduction threshold; and
    in response to the detecting, triggering the pause reduction component on the first network element, wherein the pause reduction component reduces an effect of a received pause message.

14. The non-transitory machine-readable medium of claim 13, wherein the pause reduction component suppresses an outbound pause message to another network element.

15. The non-transitory machine-readable medium of claim 13, wherein the pause reduction component error disables a port coupling a second network element to the first network element.

16. The non-transitory machine-readable medium of claim 13, wherein the pause reduction component performs a drop on data being added to a queue associated with a port that couples a second network element to the first network element.

17. The non-transitory machine-readable medium of claim 13, wherein the pause reduction component performs a drop on data in a particular traffic class being added to a queue associated with a port that couples a second network element to the first network element.

18. The non-transitory machine-readable medium of claim 17, wherein the data in the particular traffic class is data destined for a device that is coupled to the second network element.

19. The machine-readable medium of claim 13, further comprising: detecting that a characteristic of the first network element is above a pause reduction component removal threshold; and
    removing a pause reduction component on the first network element.

20. A non-transitory machine-readable medium having executable instructions to cause one or more processing units to perform a method to remove a pause reduction component, the method comprising:
    triggering the pause reduction component on a first network element, wherein the pause reduction component reduces an effect of a received pause message;
    detecting that a characteristic of the first network element is above a pause reduction component removal threshold, wherein the pause reduction component reduction threshold is based on at least one of not receiving a pause message with a certain period of time, amount time passed since a port of the network element was error disabled, a queue associated with a port receiving a pause message has an acceptably low queue occupancy rate, or a sufficient drain of a queue; and in response to the detecting, removing a pause reduction component on the first network element.

21. The non-transitory machine-readable medium of claim 20, wherein the pause reduction component suppresses an outbound pause message to another network element.

22. The non-transitory machine-readable medium of claim 20, wherein the pause reduction component error disables a port coupling a second network element to the first network element.

23. The non-transitory machine-readable medium of claim 20, wherein the pause reduction component performs a drop on data being added to a queue associated with a port that couples a second network element to the first network element.

24. The non-transitory machine-readable medium of claim 20, wherein the pause reduction component performs a drop on data in a particular traffic class being added to a queue associated with a port that couples a second network element to the first network element.

25. The non-transitory machine-readable medium of claim 24, wherein the data in the particular traffic class is data destined for a device that is coupled to the second network element.

26. A method to trigger a pause reduction component, the method comprising:

receiving a pause message on a first network element, wherein the pause message is from a second network element and indicates that data should not be transmitted by the first network element; and in response to receiving the pause message, triggering a pause reduction component on the first network element when a characteristic of the first network element is above a pause reduction threshold, wherein the pause reduction component reduces an effect of the pause message and the pause reduction threshold is selected from the group consisting of a particular number of pause messages, an inadequate drain rate of a queue associated with the second network element, and a queue occupancy of the queue associated with the second network element.

* * * * *